United States Patent
Littmann et al.

(10) Patent No.: US 11,410,578 B2
(45) Date of Patent: Aug. 9, 2022

(54) SEALING BOLT AND METHOD OF INSTALLING A SEALING BOLT

(71) Applicant: THE EUROPEAN ATOMIC ENERGY COMMUNITY (EURATOM), REPRESENTED BY THE EUROPEAN COMMISSION, Brussels (BE)

(72) Inventors: François Littmann, Cocquio Trevisago (IT); Marco Sironi, Laveno-Mombello (IT)

(73) Assignee: THE EUROPEAN ATOMIC ENERGY COMMUNITY (EURATOM), REPRESENTED BY THE EUROPEAN COMMISSION, Brussels (BE)

(*) Notice: Subject to any disclaimer, the term of this patent is extended or adjusted under 35 U.S.C. 154(b) by 992 days.

(21) Appl. No.: 16/075,578

(22) PCT Filed: Feb. 9, 2017

(86) PCT No.: PCT/EP2017/052903
§ 371 (c)(1),
(2) Date: Aug. 3, 2018

(87) PCT Pub. No.: WO2017/140575
PCT Pub. Date: Aug. 24, 2017

(65) Prior Publication Data
US 2019/0295445 A1    Sep. 26, 2019

(30) Foreign Application Priority Data
Feb. 15, 2016 (EP) .................................... 16155696

(51) Int. Cl.
*G09F 3/03* (2006.01)
*G21F 5/12* (2006.01)
(Continued)

(52) U.S. Cl.
CPC .......... *G09F 3/0317* (2013.01); *G09F 3/0329* (2013.01); *G21F 5/12* (2013.01);
(Continued)

(58) Field of Classification Search
CPC .... G09F 3/0317; G09F 3/0329; F16B 41/005; F16B 31/021; F16B 33/004; G21F 5/12
See application file for complete search history.

(56) References Cited

U.S. PATENT DOCUMENTS 3,457,823 A * 7/1969 Dillon ................... F16B 33/004
                                                    411/366.1
5,037,285 A * 8/1991 Kudert ..................... B29C 48/09
                                                    425/130
(Continued)

FOREIGN PATENT DOCUMENTS

| EP | 0 658 250 B1 | 1/1998 |
| EP | 1 042 746 B1 | 3/2002 |

(Continued)

OTHER PUBLICATIONS

Extended European Search Report for corresponding priority Application No. 16155696.4, dated Aug. 10, 2016 (6 sheets).
(Continued)

*Primary Examiner* — Mark A Williams
(74) *Attorney, Agent, or Firm* — Lewis Roca Rothgerber Christie LLP (57) ABSTRACT

A sealing bolt includes a seal head adapted to be mounted to the container lid, a seal stud adapted to be mounted to the container body, a pin connecting the seal head to the seal stud, a conductor in a transverse passage in the pin and a resilient member arranged for biasing the pin into a first position in which the conductor is compressed. The pin is movable against biasing by the resilient member into a second position by application to the seal head of a prede-
(Continued)

termined torque. The sealing bolt also includes a monitoring and detection unit including a transmitter and a detector coupled to respective ends of the conductor, and a processor coupled to the transmitter and the detector operable to determine that the pin has been moved into the second position for a first time when a signal detected by the detector has undergone a predetermined change.

19 Claims, 5 Drawing Sheets

(51) Int. Cl.
    *F16B 31/02* (2006.01)
    *F16B 33/00* (2006.01)
    *F16B 41/00* (2006.01)

(52) U.S. Cl.
    CPC ........... *F16B 31/021* (2013.01); *F16B 33/004* (2013.01); *F16B 41/005* (2013.01)

(56) References Cited

U.S. PATENT DOCUMENTS

| | | | | |
|---|---|---|---|---|
| 6,265,973 | B1* | 7/2001 | Brammall | B65D 90/22 340/568.1 |
| 6,694,593 | B1* | 2/2004 | Causse | G09F 3/0317 29/469 |
| 9,764,893 | B1* | 9/2017 | Westmoreland, III | G08B 21/18 |
| 10,145,146 | B2* | 12/2018 | Mullis | H05K 999/99 |
| 2009/0028283 | A1* | 1/2009 | Azzalin | F16B 41/005 376/205 |
| 2010/0283578 | A1* | 11/2010 | Henderson | G09F 3/0329 340/5.6 |
| 2011/0193701 | A1* | 8/2011 | Hanft | G01R 11/25 340/568.1 |
| 2011/0273852 | A1* | 11/2011 | Debrody | G09F 3/03 361/747 |
| 2016/0217877 | A1* | 7/2016 | Sironi | G21F 5/12 |
| 2017/0103683 | A1* | 4/2017 | Yazdi | E05B 39/005 |
| 2019/0187162 | A1* | 6/2019 | Shastry | B01L 3/5027 |

FOREIGN PATENT DOCUMENTS

| | | |
|---|---|---|
| EP | 1 826 421 A1 | 8/2007 |
| EP | 2 840 578 A1 | 2/2015 |
| GB | 2 067 699 A | 7/1981 |
| WO | WO 00/63052 A1 | 10/2000 |

OTHER PUBLICATIONS

International Search Report and Written Opinion for corresponding International Application No. PCT/EP2017/052903, dated May 12, 2017 (8 sheets).

* cited by examiner

SEALING BOLT AND METHOD OF INSTALLING A SEALING BOLT

CROSS-REFERENCE TO A RELATED APPLICATIONS

This application is a National Phase Patent Application of International Patent Application Number PCT/EP2017/052903, filed on Feb. 9, 2017, which claims priority of and benefit to European Patent Application Number 16155696.4, filed on Feb. 15, 2016, the contents of all of which are incorporated herein by reference.

TECHNICAL FIELD

The present invention generally relates to a sealing bolt, in particular sealing bolts for sealing nuclear containers. Such a sealing bolt securely connects a container lid to a container body and may comprise means for identifying the individual bolts or containers. The invention further relates to a method of installing a sealing bolt.

BACKGROUND ART

Under some circumstances, the secure sealing of containers is necessary. It is of particular importance if such containers hold dangerous substances, such as for example fissile materials. In most cases, the container lid is connected to the container body by the use of at least one sealing bolt. Most often such a sealing bolt contains some kind of integrity element, breaking in case of violation and thereby revealing that the container may have been tampered with. Such a breakable integrity element can be concealed somewhere within the sealing bolt, which makes it more difficult to differentiate between standard sealing bolts and sealing bolts with additional security features. Thereby the number of sealing bolts with security features necessary to securely seal a container may be reduced.

An example of a sealing bolt in its most basic design is disclosed in GB-A-2067699. In one of the embodiments of the disclosure, the seal head is connected to its stud by a frangible integrity element that breaks at a given torque.

To further increase the security of sealing bolts, an identification element may be concealed inside the sealing bolts so as to reveal if the initial sealing bolt has been replaced by another sealing bolt of the same type. If the identity of the sealing bolt is different and/or the integrity element is broken, the sealing device or/and the contents of the container may have been tampered with.

Even if the existing sealing bolts already seal the containers very securely, there still is a need to further improve the security. Moreover, with the phasing out of nuclear plants, a lot of spent nuclear fuel will have to be stored in dry storage casks (containers), in Europe and throughout the world. Inspectors of Safeguards agencies will not be able to be physically present for the sealing operations needed for all of those casks. This is because of the huge costs of manpower and travel that would be involved, but also because operators perform filling of the casks at random intervals, depending on the process speed at their site.

It is known to provide for the sealing of casks without the physical presence of the inspectors, i.e. by means of remote monitoring with video surveillance; however, video surveillance is easily tampered with.

There is a need for systems and methods with enhanced security that enables a sealing device to be installed by the operator without the presence of an official inspector. In particular, there is a need for systems and methods that enable the sealing bolt to be shipped by the inspectors to the operator, such that they can trust/verify that first use of the sealing bolt has not occurred before installation. I.e., once installed, it should be possible to verify that the seal (sealing bolt) has been installed just once.

Technical Problem

It is an object of the present invention to provide a sealing bolt with improved security features and operable whereby a sealing bolt may be installed by the operator of a storage site without the presence of inspectors. It is a further object of the present invention to provide a method of installing a sealing bolt.

General Description of the Invention

The present invention relates to a sealing bolt for sealing a container lid to a container body. The sealing bolt comprises a seal head adapted to be mounted to said container lid, a seal stud adapted to be mounted to the container body and a pin connecting the seal head to the seal stud. The sealing bolt further comprises a conductor arranged through a transverse passage in the pin. The sealing bolt further comprises a resilient member arranged for biasing the pin into a first position, in which the conductor is compressed. The pin is movable against the biasing by the resilient member into a second position by application to the seal head of a predetermined torque. The sealing bolt further comprises a monitoring and detection unit, the monitoring and detection unit including a transmitter and a detector coupled to respective ends of the conductor, and a processor, coupled to the transmitter and the detector, the processor being operable to determine that the pin has been moved into the second position for the first time when it determines that a signal detected by the detector has undergone a predetermined change.

Thus, the monitoring and detection unit records when the signal detected by the detector has undergone the predetermined change, corresponding to first usage of the sealing bolt, and any attempt to reuse the sealing bolt can be prevented. On the other hand, as long as the monitoring and detection unit indicates that the predetermined change has not yet occurred, closer inspection may not be necessary. This is of particular importance as this can be verified by an inspector, and upon receipt by the operator of the storage facility and prior to installation of the bolt, that the bolt has not already been used.

In one embodiment, the predetermined change comprises a change in detected signal magnitude greater than a first predetermined threshold.

In another embodiment, the predetermined change comprises a transition in detected signal magnitude from below a second predetermined threshold ($V_L$) to above a third predetermined threshold ($V_U$).

The predetermined change may comprise (i) the change in detected signal magnitude or (ii) the transition in detected signal magnitude, respectively, having a duration less than or equal to a predetermined time threshold.

The processor may be operable to sample the detected signal magnitude at a predetermined frequency to derive sampled signal magnitudes. The monitoring and detection unit may further comprise a non-volatile memory, and the processor may be operable to store the sampled signal magnitudes in a log in the non-volatile memory. The sampled signal magnitudes are time- and date-stamped in the log in the non-volatile memory.

Preferably, the conductor comprises an optical fiber, the transmitter comprises an optical transmitter, and the detector comprises an optical detector. The processor of the monitoring and detection unit is able to determine that the pin has been moved based on the modification of an optical signal passing through the optical fiber. The monitored property of the optical signal may e.g. be its light intensity.

Alternatively, the conductor may comprise an electrical cable. In which case, the transmitter would comprise an electrical transmitter and the detector would comprise an electrical detector. The processor of the monitoring and detection unit is able to determine that the pin has been moved based on the modification of an electrical signal passing through the electrical cable. The monitored property of the electrical signal may e.g. be its voltage or current.

Alternatively, the conductor may comprise a fluid tube. In which case, the monitoring and detection unit would comprise a fluid detector. The processor of the monitoring and detection unit is able to determine that the pin has been moved based on the modification of a signal representative of the fluid in the tube. The monitored property of the fluid may e.g. be its pressure in the tube or flow through the tube. The fluid tube may be a plastic tube or a rubber tube.

Preferably, the monitoring and detection unit further comprises one or more visual indication elements. In embodiments, the processor is operable to illuminate the one or more visual indication elements (i) in a first state, indicating that the pin has not yet been moved out of the first position, or (ii) in a second state, indicating that that the pin has been moved into the second position for the first time. In embodiments, (i) in the first state, one of the one or more visual indication elements are illuminated and, in the second state, two or more of the visual indication elements are illuminated, and/or (ii) in the first state, the one or more visual indication elements are illuminated in a first color, e.g. red, and, in the second state, the one or more visual indication elements are illuminated in a second color, e.g. green.

The predetermined torque may correspond to a compressive force on the resilient member lying in the range of 700-2500 daN, preferably 700-1500 daN.

The predetermined torque may correspond to an axial displacement of the pin relative to the seal head lying in the range of 0.5-1.5 mm, preferably 0.7-1.3 mm.

The invention further relates to a method of installing a sealing bolt. The method comprises providing a sealing bolt. The method further comprises transporting the sealing bolt to an installation site at which a container to be sealed is disposed. If not, the method further comprises installing the sealing bolt on the container. The installing includes applying the predetermined torque to the sealing head of the sealing bolt until the processor determines that the signal detected by the detector has undergone the predetermined change. The step of transporting the sealing bolt to an installation site may comprise placing the sealing bolt in a tamper prevention system, optionally verifying that the tamper prevention system has not been first used or tampered with, transporting the tamper prevention system to the installation site at which a container to be sealed is disposed, verifying that the tamper prevention system has not been first used or tampered with and removing the sealing bolt from the tamper prevention system.

In embodiments, a sealing bolt is provided
a. with ultrasonic features such as an identity and locking integrity, readable with an ultrasonic reading head,
b. with a conductor passing through, connected to the electronic monitoring system, and/or
c. with an internal mechanical system with springs pressing the conductor in two different states, tightened or free, thus modifying the parameters of a signal passing through the conductor or of a fluid in the conductor.

In embodiments, an electronic monitoring and detection device is provided
a. running on batteries, having internal sensors, pressure, temperature, vibration, acceleration . . . ,
b. which registers all the events monitored and store them into its internal memory,
c. operates during the period of time between shipment from inspectorate agencies and the venue of the inspector on site,
d. which is connected to a loop of fiber optic passing through the seal, able to monitor the variation of the quantity of light, detecting when the seal is tightened with the requested amount of torque
e. which incorporates anti-tampering features.

In embodiments, the sealing bolt has an identity element and/or a frangible element used as integrity indicator.

In embodiments, there is an association of the active electronic monitoring device detecting and registering all the events during the life of the seal with internal mechanism changing the conductor signal before and after installation, proving that the seal has been correctly installed and remained in the same spot.

In embodiments, the electronic monitoring device is set up by the inspector and begins monitoring at the headquarters and will continuously monitor and register all incoming events during the few months between the dispatch of the seal, the seal installation and the final physical verification by one inspector of the seal on the cask. There is then monitoring of the conductor signals passing through the conductor.

Advantageously, the fact that a sealing bolt has not been previously used/installed may readily be verified by an operator prior to installation (as well as by an inspector prior to shipping to the operator), e.g. by means of suitable visual indicator elements visible on the monitoring and detection unit. Thus, time and effort in inspecting/verification can be saved.

Further advantages of the invention, at least in embodiments, include:
a. to enable installation by the operator alone, but verified later, during an inspection by an inspector who is able to trust that the seal has not been tampered with in the meantime,
b. to identify univocally the sealing bolt and the cask,
c. to allow remote monitoring of the casks sealed with a conductor loop closed by an electronic seal, avoiding the manual reading at regular intervals of the seals by an inspector,
d. to provide a rupture of the conductor (fiber optic or electrical cable or fluid tube) when the seal is tampered or opened,
e. to allow a secure check of the identity and integrity of the seal through ultrasonic scanning in case of doubts or possible attacks.

A conductor may be arranged through a transverse passage in the pin, wherein said conductor is a fiber optic or an electrical cable or a fluid tube, the conductor being arranged such that any rotational or translational movement of the pin with respect to the seal head and/or the seal stud causes the conductor to break.

The seal head may further comprise a borehole, preferably in axial direction and a header plate. The pin may be connected to the header plate and pass through the borehole.

The pin may comprise an area of reduced thickness providing a weak point causing said pin to fail if a predetermined tensile stress or a predetermined sheer stress of said pin in said area of reduced thickness is reached. Such an area of reduced thickness may e.g. be arranged in proximity to the header plate, thereby causing the pin to break near the header plate, leavening the rest of the pin intact.

The seal stud can further comprise a clamping element connecting the pin to the seal stud to the pin and preventing the release of the pin. Such a clamping element provides a simple installation of the seal head to the seal stud since the pin can slide into the clamping element by applying a manual vertical force to the header plate and subsequently to the pin. Thereafter the pin cannot be released without destroying the integrity of the pin.

Preferably, the pin comprises a cone shaped end portion, thereby reducing the amount of vertical force needed to slide the end portion of the pin into the clamping element.

Advantageously, the seal head comprises lateral passages aligned with the transverse passage of the pin. These lateral passages are preferably arranged such that the conductor can be fed through one lateral passage, through the transverse passage of the pin and then through the other lateral passage.

The sealing bolt can further comprise identification means for verifying the identity of the pin and/or the sealing bolt. Such identification means may e.g. be ultrasonic elements or RFID-tags univocally identifying the sealing bolt, the container and its contents. The ultrasonic elements can further be used to monitor the integrity of the sealing bolt.

The sealing system may further comprise communication means associated with the monitoring and detection unit, the communication means being arranged and designed for transmitting status information of the conductor to a remote location. Thus a tampering attempt may be immediately detected and transmitted to a remote location immediately upon detection. The integrity of the container may thus be monitored in real-time from a remote location. The verification of the continuity of the conductor is of particular interest when the container is arranged in an area of high risk, such as e.g. an irradiated area. As long as the conductor remains intact, it can be assumed that the container has not been tampered with. Other security features, such as e.g. ultrasonic identification means or integrity features, may not need to be checked in the area of high risk. Indeed, these other security features may be checked, measured and recorded at the time of sealing of the container. Just before the container is to be opened, these other security features may be checked again. Periodic checks between the sealing and the opening of the container may, if desired, still be carried out. Such periodic checks can, thanks to the present invention, be carried out at greatly increased intervals, thereby avoiding exposing personnel unnecessarily to the dangers reigning in the area of high risk.

The communication means can comprise encryption means for encrypting the status information. Any information sent from the sealing system to the remote location may be carried out securely, thereby preventing others from interfering with the transmission of the status information.

BRIEF DESCRIPTION OF THE DRAWINGS

Further details and advantages of the present invention will be apparent from the following detailed description of several not limiting embodiments with reference to the attached drawings, wherein:

FIG. 9 provides dimensions and parameters of Belleville washers suitable for use in embodiments of the invention.

DESCRIPTION OF PREFERRED EMBODIMENTS

The need for a sealing device able to be installed by the operator without the presence of an inspector is of utmost importance and urgency. At least in embodiments, the present invention seeks to provide a sealing system to be applied to nuclear dry storage casks that fulfils one or more of the following goals:

- to be installed by the operator alone but to be verified later on, during an inspection, by an inspector who has to trust that the seal has not been tampered in the meantime, meaning that the content of the cask is the same as when it was initially sealed;
- to include an anti-tampering enclosure containing the seal and an electronic monitoring device enabling the package to be shipped by the inspectors to the operator, while trusting that it has not been modified before installation;
- to include an electronic system connected to a conductor (e.g. optical fiber or electric cable or fluid tube) passing through the seal which detects that the seal has been installed just once;
- to be used on nuclear dry storage casks for replacing one or more cask bolts, without requiring modification of the cask itself;
- to include a conductor in the body of the seal that breaks at any attempt of tampering;
- to allow verification of the identity and integrity of the seal through an ultrasonic inspection;
- to carry an identity which can be univocally coupled with the container; and
- to be able to withstand harsh operating conditions.

In the description and drawings, like numerals are used to designate like elements. Unless indicated otherwise, any individual design feature, component or step may be used in combination with any other design features, components or steps disclosed herein.

In implementing the present invention in respect of a sealing bolt (and reader therefor), techniques as set out in EP 0 658 250 may be used, except as described hereinafter.

Figure 1:
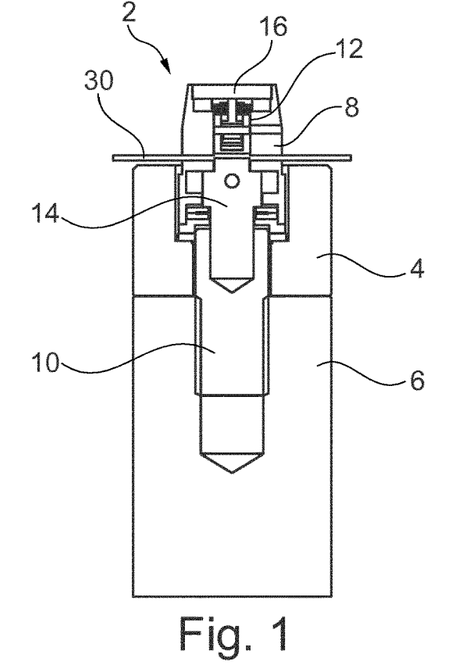
FIG. 1 is a cross sectional view through an assembled sealing bolt in accordance with an embodiment of the invention, in a first position.

FIG. 1 illustrates a preferred embodiment of a sealing bolt 2 in a first position. The sealing bolt 2 is in assembled state, and being used for sealing a container lid 4 to a container body 6. The sealing bolt 2 comprises a seal head 8 and a seal stud 10, the latter being fixedly arranged in the container body 6. The seal head 8 comprises a borehole 12 arranged along a vertical axis of the seal head 8. The borehole 12 is dimensioned and arranged for receiving a pin 14 therethrough. The pin 14 is connected with its upper end to a header plate 16, which is in turn connected to the seal head 8. At its lower end, the pin 14 is connected to the seal stud 10.

The pin 14 may comprise an area of reduced thickness (not shown) in which a rupture of the pin 14 is expected to occur when the seal head 8 is moved relative to the seal stud 10.

Figure 2:
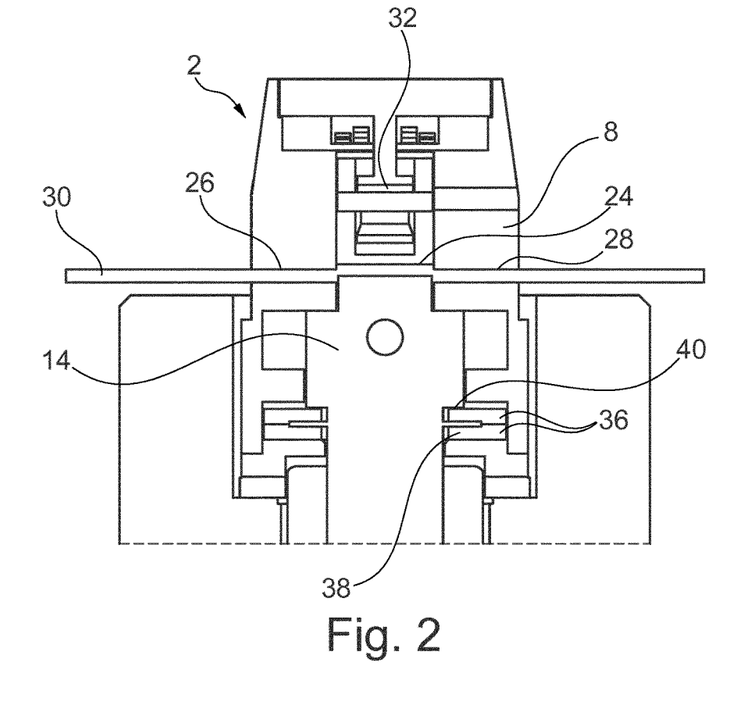
FIG. 2 is an enlarged cross sectional view of the sealing bolt of FIG. 1.

As best seen in FIG. 2, which is an enlarged cross-sectional view of the sealing bolt of FIG. 1, according to an embodiment of the present invention, the sealing bolt 2 further comprises a transverse passage 24 arranged through the pin 14 and two lateral passages 26, 28, which are designed to be in alignment with the transverse passage 24 when the sealing bolt 2 is assembled. As conductor, a fiber optic 30 is fed through the first lateral passage 26, the transverse passage 24 and the second lateral passage 28. This fiber optic 30 is used to not only verify the correct installation of the sealing bolt 2, but also the integrity of the sealing bolt 2.

During unscrewing of the seal, the seal head 8 freely rotates with respect to the pin 14 until it reaches an abutment, whereafter it then also entrains the seal stud 10 and the pin 14. As the seal head 8 rotates with respect to the pin 14, the fiber optic 30 passing through both is ruptured by Guillotine effect and a portion 30' of the fiber optic 30 may be left within the pin 14. The rupture of the fiber optic 30 is used to detect the opening of the sealing bolt 2 through the interruption of a signal passing through the fiber optic 30.

The seal head 8 is further provided with an identification element 32, storing a univocal identity of the sealing bolt 2. Such identification element 32 may comprise an ultrasonic identity element or an RFID tag. In the case of an ultrasonic identity element, techniques as set out in EP 1 042 746 may be used in its implementation.

Further in accordance with embodiments of the invention, the sealing bolt 2 has mounted therein a resilient member, in this embodiment a spring washer 36. The inner upper portions 38 of the spring washer 36 engage the shoulder 40 of pin 14, thereby urging pin 14 upwards. As a consequence, transverse passage 24 of pin 14 pushes the fiber optic 30 upwards and compresses it. The fiber optic 30 is thus in a first (compressed) condition prior to installation. Thus, FIGS. 1 and 2 illustrate the sealing bolt 2 in place but not tightened, springs 36 not fully loaded, and the fiber optic 30 compressed. In this condition (seal not tightened):
  a. the two inner spring washers 36 are slightly loaded to maintain a minimal pressure on the fiber optic 30
  b. the fiber optic 30 is pressed between the sealing head 8 and the pin 14, the quantity of light passing through is deceased and monitored an electronic device (discussed hereinafter) meaning not yet correctly installed
  c. the ultrasonic integrity element 24 is connected to the pin 14 in rotation but is free in vertical translation.

With regard to spring washer 36, for this a Belleville washer is suitably used. Belleville washers allow for having a very high force in a small space and, even when completely crushed, one cannot exceed the elastic limit. They may be put in series or in parallel if one wishes to increase the stroke or the force.

The specific washer used in the present embodiment is indicated in the highlighted column of FIG. 9: this washer operates well in the illustrated design, including the stress on the outer diameter so that the seal can be inserted into the cavity of the sealing bolt 2, maximizing the effort in compression of the spring washer 36. As will be appreciated, a force may be applied to compress the washer 36 below shoulder 40 during installation of the washer; and once released, the spring washer 36 consequently applies an upward compressive force on the fiber optic 30 via the pin 14.

In the present embodiment, a stress or force of 775 daN is obtained by compressing 1 mm. In addition, to obtain higher forces, two or three of the washers 36 may be placed parallel or in series to optimize the desired force and displacement required for pinching and releasing the fiber optic 30 completely.

A predetermined torque must be applied to seal head 8 in order to counteract the force of spring washer 36, to bring the two lateral passages 26, 28, back into alignment with the transverse passage 24, and thus bring fiber optic 30 back into a fully straight condition. Concerning the association torque/force, this depends on several parameters such as lubrication of the thread of the bolt. For the present purposes, what is important is to generate sufficient force so as to not be able to block the mechanism with something microscopic that could be inserted by the operator. The use of two washers 36 such as this in series would mean that a force of 1500 daN (1.5 tons) was required to block the mechanism. Moreover, even if the force generated in the bolt tightening torque is greater than the maximum force washers, such a washer will stop but will not be destroyed because it cannot exceed the elastic limit.

In embodiments, the predetermined torque corresponds to a compressive force on the resilient member lying in the range of 700-2500 daN, preferably 700-1500 daN.

In embodiments, predetermined torque corresponds to an axial displacement of the pin relative to the seal head lying in the range of 0.5-1.5 mm, preferably 0.7-1.3 mm. In order to detect first use of the sealing bolt 2, the sealing bolt 2 is provided to the operator in the condition ("first position") shown in FIG. 2.

Figure 3:
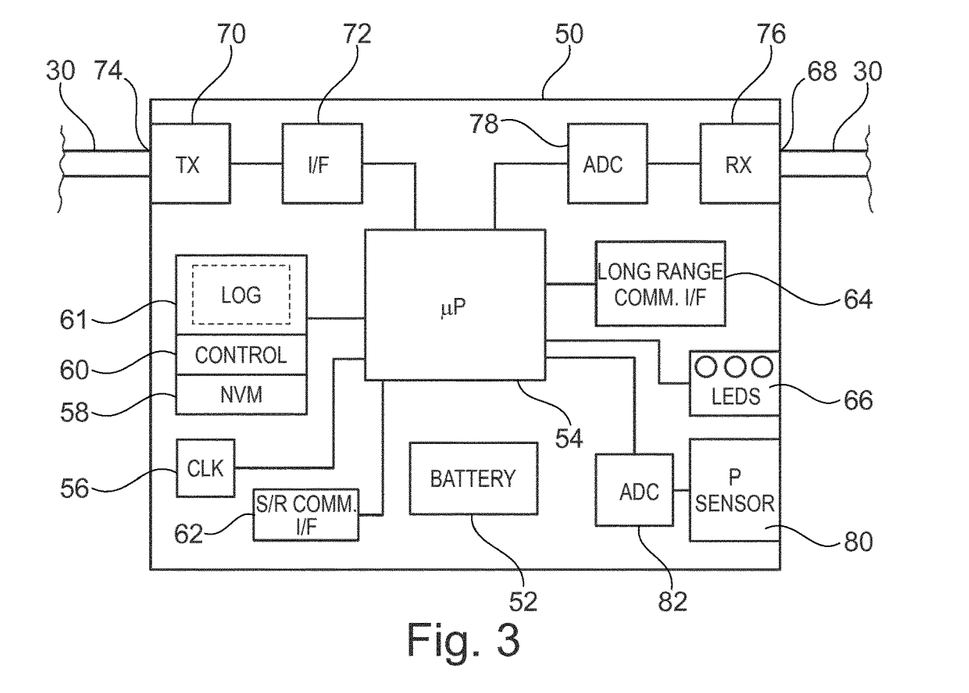
FIG. 3 is a schematic block diagram of a monitoring and detection unit used in embodiments of the invention.

FIG. 3 is a schematic block diagram of an electronic monitoring and detection unit 50, used in accordance with embodiments, e.g. for detecting first use of the sealing bolt 2. The electronic monitoring and detection unit 50 may be provided in a robust, compact housing (not shown) that is sealed, for example, by welding.

The electronic monitoring and detection unit 50 is independently powered, e.g. by battery 52, which may have a life of many months to many years. The electronic monitoring and detection unit 50 includes a microprocessor 54, which receives a clock signal from clock 56. The microprocessor 54 may derive real-time date and/or time from clock 56, or may obtain such data continuously from a real-time clock (not-shown), provided within electronic monitoring and detection unit 50; and the real-time date and/or time may be used for time-stamping of data, as discussed below.

Microprocessor 54 is also coupled to non-volatile memory (NVM) 58 which stores control software 60 (e.g. hardwired or firmware) for execution by microprocessor 54 for controlling the electronic monitoring and detection unit 50.

The electronic monitoring and detection unit 50 may further include a short-range communications interface 62 (e.g. near field communication (NFC), radio-frequency ID (RFID) or Bluetooth®), for conducting short-range communications with nearby devices, i.e. over a distance of a few centimeters to a few meters. The electronic monitoring and detection unit 50 may further include a long-range communications interface 64 (e.g. long-range radio or cellular wireless), for conducting long-range communications with remote devices, i.e. over a distance of a few Km to a few hundreds of Km, such as for remote reporting and maintenance.

Preferably, the electronic monitoring and detection unit 50 includes visual indication elements for indicating a current state or status of monitoring and detection unit 50. In this embodiment, the visual indication elements comprise LEDs 66.

In one embodiment, the electronic monitoring and detection unit 50 includes an optical transmitter 70 coupled to processor 54 by interface 72. Via a suitable connector (not shown), one end 74 of fiber optic 30 (see FIG. 2) is connected to optical transmitter 70. In use, optical transmitter 70 transmits optical signals (e.g. constant power/intensity) out through fiber optic 30. In this embodiment, the electronic monitoring and detection unit 50 includes an optical receiver/detector 76, coupled to processor 54 via interface analog-to-digital converter 78. Via a suitable connector (not shown), the other end 68 of fiber optic 30 (see FIG. 2) is connected to optical detector 76. The processor 54 thus receives in digital form signals indicating the magnitude or received optical signal detected by optical detector 76.

In another embodiment, the electronic monitoring and detection unit includes an electrical transmitter and an electrical receiver/detector, both coupled to an electrical cable. The electrical transmitter transmits electrical signals (e.g. constant power/intensity) out through the electrical cable.

In yet another embodiment, the electronic monitoring and detection unit includes a fluid transmitter and a fluid receiver/detector, both coupled to a fluid tube. The electronic monitoring and detection unit monitors the parameters (e.g. pressure or flow) of the fluid in the fluid tube.

In use, the received signals are used by the processor 54 to determine whether and/or when the sealing bolt has been moved into a second position for the first time. In this embodiment, when a sufficient and predetermined torque is applied to seal head 8 of sealing bolt 2 (see FIG. 2), a required pressure is applied to counteract the biasing by spring washer 36 to move the sealing bolt 2 into a second position.

Figure 4:
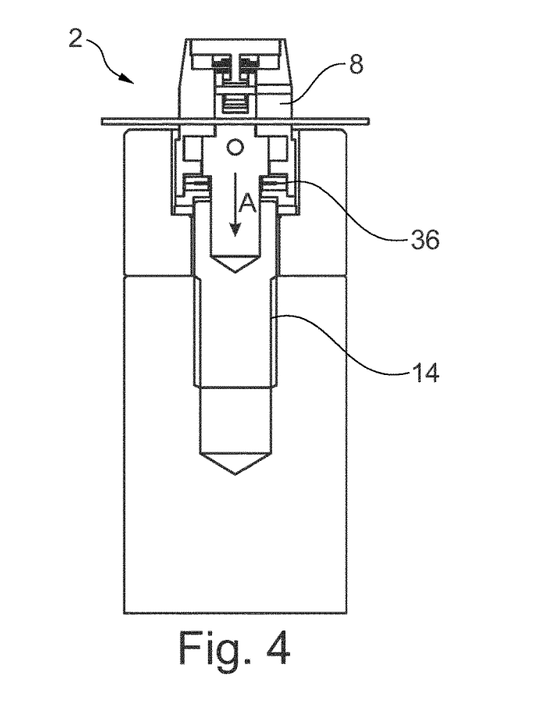
FIG. 4 is a cross sectional view through an assembled sealing bolt in accordance with an embodiment of the invention, in a second position.

FIG. 4 is a cross sectional view through an assembled sealing bolt in accordance with an embodiment of the invention, in a second position. This shows the disposition after application of the required predetermined torque to sealing head 8 so as to move pin 14 in the direction of arrow A against the spring bias of spring washer 36. The latter is now in a compressed form.

Figure 5:
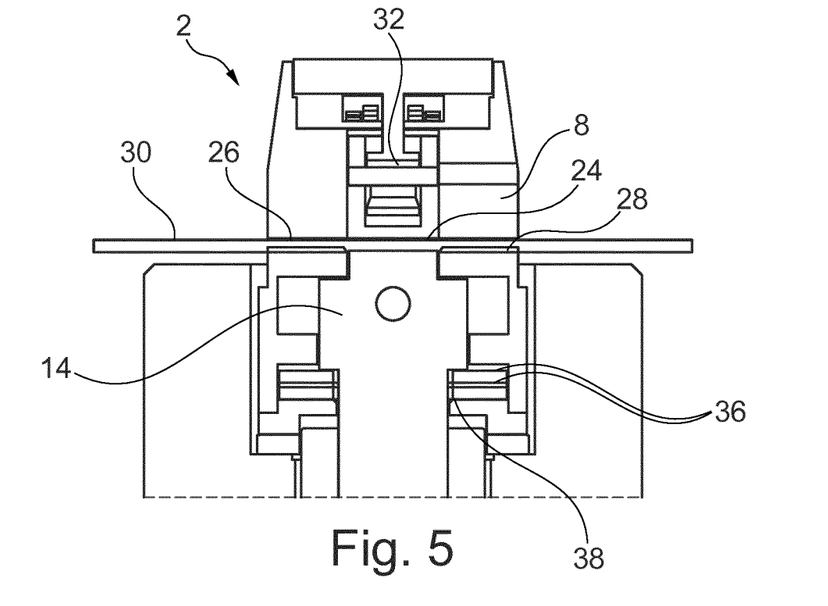
FIG. 5 is an enlarged cross sectional view of the sealing bolt of FIG. 4.

FIG. 5 is an enlarged cross sectional view of the sealing bolt of FIG. 4. Here, it can be seen that, in this second position, the predetermined torque applied to seal head 8 has brought the two lateral passages 26, 28, back into alignment with the transverse passage 24, and thus brought fiber optic 30 back into a fully straight condition. Thus, FIGS. 4 and 5 illustrate the sealing bolt 2 tightened, spring(s) 36 fully loaded, and the fiber 30 freed, meaning the sealing bolt 2 has been correctly installed once. In this condition (seal tightened):

a. the two inner spring washers 36 are fully loaded (e.g. roughly 1 ton) which means that the seal bolt 2 is tightened at a torque high enough to avoid undetected withdrawal. Pressure on the fiber optic 30 is released so maximum light is passing through it and monitored by the monitoring and detection unit 50, meaning the seal is now correctly installed.

b. the ultrasonic integrity element is still connected to the pin 14 in rotation but is free in vertical translation. The seal head 8 drives the pin 14 in rotation while tightened by means of a grain and pin (in reverse sense of rotation, pin 14 and seal head are free to rotate one with respect to the other, breaking the integrity element).

After the installation, the ultrasonic identity element is read for the final identification of the sealing bolt 2 and the integrity is checked. These readings are made using an ultrasonic reading head.

When the seal is removed, the pin 14 is fixed due to being tightened on the cask (container), the seal head 8 is rotating, which means that the fiber optic 30 will be cut between seal head 8 is and pin, and the integrity element will break due to being coupled in rotation with the pin 14 and welded to the seal head 8.

Thus, the sealing bolt 8 transitions under the required predetermined torque from a first position (FIGS. 1, 2), in which fiber optic 30 is compressed by pin 14, to the second position (FIGS. 4, 5), in which fiber optic 30 is uncompressed by pin 14 and in a fully straight condition. As a consequence, and referring to FIG. 3, received signal levels at the detector 76 are higher in the second position than in the first position.

Figure 6:
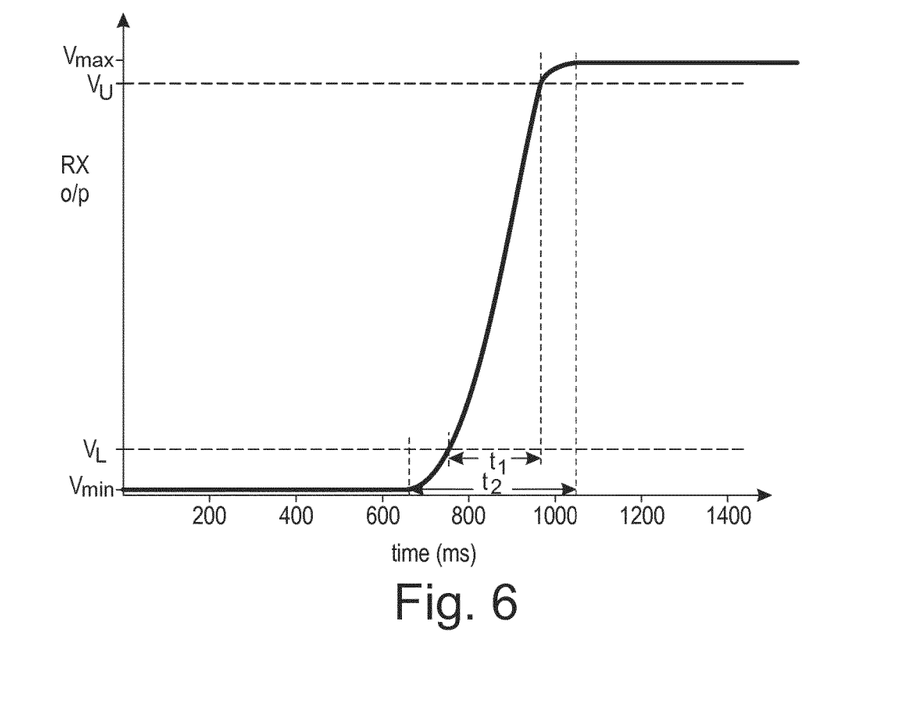
FIG. 6 is a plot of signal magnitude output at optical detector during a transition from first position to the second position.

FIG. 6 is a plot of signal magnitude output at optical detector 76 during a transition from first position to the second position. The magnitude transitions from $V_{min}$ to $V_{max}$, and the time taken to do so is $t_2$. The processor 54 (FIG. 3) of the monitoring and detection unit 50 determines, based on the signal magnitude generated at optical detector 76, whether a signal transition indication of the predetermined torque being applied has first occurred, as when the sealing bolt 2 is properly installed for the first time.

In one embodiment, processor 54 (FIG. 3) determines whether the signal magnitude over time conforms to a first predetermined change, i.e. the change in magnitude is greater than a first threshold, i.e. $(V_{max}-V_{min}) >= V_{Thresh1}$. Alternatively, processor 54 (FIG. 3) determines whether the signal magnitude over time conforms to a second predetermined change, i.e. the change in magnitude is greater than a first threshold and the duration of transition is within a first time period ($T_{Thresh1}$), i.e. $(V_{max}-V_{min}) >= V_{Thresh1}$ AND $t_2 <= T_{Thresh1}$.

In another embodiment, processor 54 (FIG. 3) determines whether the signal magnitude over time conforms to a third predetermined change, i.e. the signal magnitude transitions from below a first threshold to above a second threshold, i.e. $V_{min} < V_L$ AND $V_{max} > V_U$. Alternatively, processor 54 (FIG. 3) determines whether the signal magnitude over time conforms to a fourth predetermined change, i.e. the signal magnitude transitions from below the first threshold to above the second threshold and the duration of transition is within a second time period ($T_{Thresh2}$), i.e. $V_{min} < V_L$ AND $V_{max} > V_U$) AND $t1 <= T_{Thresh2}$.

In embodiments, the monitoring and detection unit further comprises one or more visual indication elements (LEDs 66).

In embodiments, the processor is operable to illuminate the one or more LEDs 66 (i) in a first state, indicating that the pin has not yet been moved out of the first position, or (ii) in a second state, indicating that that the pin has been moved into the second position for the first time.

In embodiments, (i) in the first state, one of the one or more LEDs 66 are illuminated and, in the second state, two or more of the LEDs 66 are illuminated, and/or (ii) in the first state, the one or more LEDs 66 are illuminated in a first color, e.g. red, and, in the second state, the one or more LEDs 66 are illuminated in a second color, e.g. green.

Referring to FIG. 3, preferably, signal magnitude generated at optical detector 76 is sampled at a predetermined frequency (which may be 1-100 KHz).

In one embodiment, processor 54 (FIG. 3) stores in NVM 58 a log of sampled and other data, i.e. in log 61. For example, in log 61 there may be stored all signal magnitude samples for the last period, e.g. the last 30-60 seconds, the last 300-600 seconds, or the last 30-60 minutes. In one embodiment, the processor discontinues sampling once one of the abovementioned predetermined changes in the magnitude signals is logged.

In one embodiment, processor 54 (FIG. 3) stores, in log 61, all data in a time and/or date-stamped manner, ready for later retrieval. Preferably, the last stored set of sampled magnitude signals, and/or the occurrence of one of the abovementioned predetermined changes in the magnitude signals, is stored together with a respective timestamp. In this way, the exact date time of the first use/installation of the sealing bolt 2 may be retrieved from the memory, as well as the sampled magnitude signals that it is based on.

Figure 7:
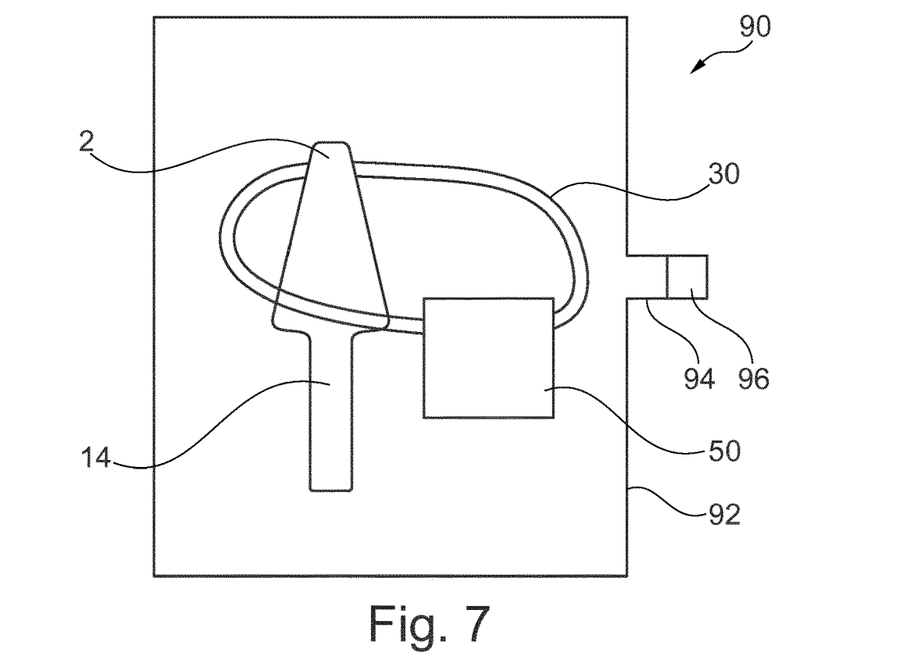
FIG. 7 shows a tamper prevention system according to an embodiment of the invention, in a pre-evacuated condition.

FIG. 7 shows a tamper prevention system 90 according to an embodiment of the invention, in a pre-evacuated condition. A sealing bolt 2 comprising seal head 8 and pin 14 is placed in an anti-tamper enclosure of the tamper prevention system 90, in this embodiment a bag 92. The bag 92 may be made of plastics material, such as polyvinylchloride (PVC). However, it will be appreciated by persons skilled in the art that other rigid or semi-rigid materials may be used.

The sealing bolt 2 may be the same as that described hereinbefore with reference to FIGS. 1-2 and 4-5.

As discussed above with reference to FIGS. 2-3, the ends of fiber optic 30 are optical transmitter and optical receiver (not shown) of the monitoring and detection unit 50.

Bag 92 includes a port 94 for engagement with an apparatus (not shown) for applying a vacuum, in use, to the interior of the bag 92. The port 94 is sealable (i.e. during application of the vacuum). For example, sealing may be accomplished by thermal welding of end cap 96 of port 94.

Figure 8:
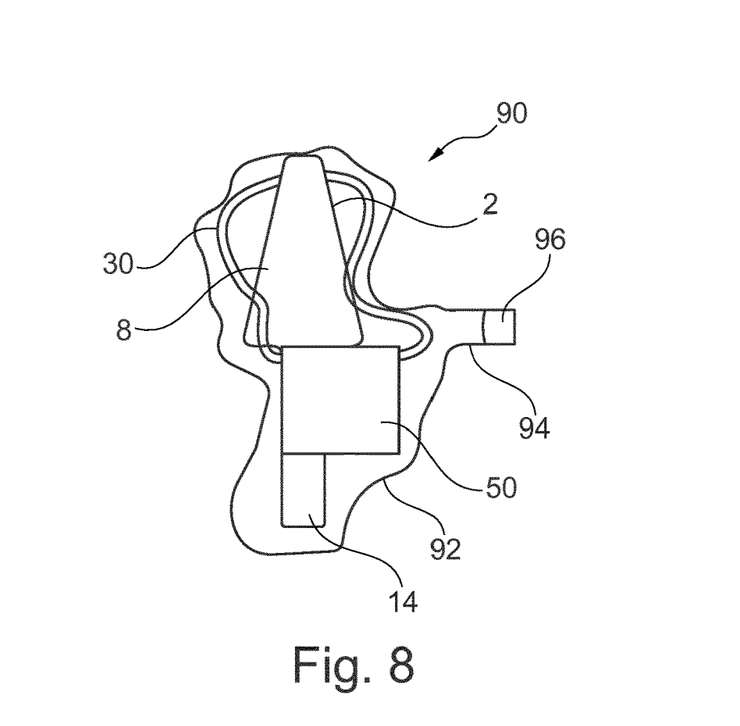
FIG. 8 shows the tamper prevention system of FIG. 7, after evacuation.

FIG. 8 shows the tamper prevention system 90 of FIG. 7, after evacuation. It can be seen that the bag 92 is totally collapsed around the sealing bolt 2, fiber optic 30 and monitoring and detection unit 50: following sealing of the end cap 96, these elements are vacuum packed inside bag 92.

Referring once again to FIG. 3, at least in this embodiment, monitoring and detection unit 50 includes a pressure sensor 80 coupled to processor 54 via ADC 82. The processor 54 thus continuously receives signals indicative of the (magnitude of the) pressure inside the bag 92.

Under the control of software in NVM 58, processor 54 is operable to determine when a (predetermined) change in pressure within the bag occurs, or rapidly occurs, i.e. from very low to atmospheric pressure.

The predetermined change may comprise a change in the sensed magnitude of the pressure greater than a first predetermined threshold. Alternatively, the predetermined change comprises a transition in the sensed magnitude of the pressure from below a second predetermined threshold ($P_L$) to above a third predetermined threshold ($P_U$).

In embodiments, the predetermined change comprises (i) the change in the sensed magnitude of the pressure or (ii) the transition in the sensed magnitude of the pressure, respectively, having a duration less than or equal to a predetermined time threshold.

The processor 54 may be operable to sample the sensed magnitude of the pressure at a predetermined frequency to derive sampled pressure magnitudes. The processor 54 may be operable to store the sampled pressure magnitudes in the log 61 log in the non-volatile memory 58. The sampled pressure magnitudes may be time- and date-stamped in the log in the non-volatile memory.

In embodiments, the processor is operable to illuminate the one or more LEDs 66 (i) in a first state, indicating that the enclosure has not been opened since sealing of the evacuation port under vacuum, or (ii) in a second state, indicating that that the enclosure has been opened since sealing of the evacuation port under vacuum. For example, (i) in the first state, one of the one or more LEDs 66 are illuminated and, in the second state, two or more of the LEDs 66 are illuminated, and/or (ii) in the first state, the one or more LEDs 66 are illuminated in a first color, e.g. red, and, in the second state, the one or more LEDs 66 are illuminated in a second color, e.g. green.

In use, a method of installing a sealing bolt may comprise first providing or obtaining (i.e. by the inspector) a tamper prevention system as described above.

Optionally, the inspector undertakes verifying that the bag 92 of the a tamper prevention system has not been opened since sealing of the evacuation port 94 under vacuum.

Next, the tamper prevention system is transported (e.g. at the instigation of the inspector) to an installation site at which a container to be sealed is disposed.

Then, once received by the operator, the operator undertakes verifying that the bag 92 has not been opened since sealing of the evacuation port under vacuum. This may involve, e.g., visual inspection of the state indicated by the LEDs 66 illuminated on the monitoring and detection unit 50, or verification by communication with the monitoring and detection unit 50 via short-range communications interface 56, e.g. via NFC.

If the state of the LEDs 66 (e.g. red) indicates that the bag 92 has been opened since evacuation, the sealing bolt 8 it contains is not installed and is discarded.

If, on the other hand, the state of the LEDs 66 (e.g. green) indicates that the bag 92 has not been opened since evacuation, the sealing bolt 8 it contains is removed from the bag 92.

Then, the sealing bolt 8 is installed in the appropriate container.

While embodiments have been described by reference to embodiments of survey devices having various components in their respective implementations, it will be appreciated that other embodiments make use of other combinations and permutations of these and other components.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim.

Furthermore, while some embodiments described herein include some but not other features included in other embodiments, combinations of features of different embodiments are meant to be within the scope of the invention, and form different embodiments, as would be understood by those in the art.

In the claims below and the description herein, any one of the terms comprising, comprised of or which comprises is an open term that means including at least the elements/features that follow, but not excluding others.

Thus, while there has been described what are believed to be the preferred embodiments of the invention, those skilled in the art will recognize that other and further modifications may be made thereto without departing from the spirit and scope of the invention, and it is intended to claim all such changes and modifications as fall within the scope of the invention.

| Legend: | | | |
|---|---|---|---|
| 2 | sealing bolt | 56 | clock |
| 4 | container lid | 58 | NVM |
| 6 | container body | 60 | control software |
| 8 | seal head | 61 | log |
| 10 | seal stud | 62 | short-range communications interface |
| 12 | borehole | | |
| 14 | pin | 64 | long-range communications interface |
| 16 | header plate | | |
| 18 | area of reduced thickness | 66 | LEDs |
| 24 | transverse passage | 68 | $2^{nd}$ end of fiber optic |
| 26 | first lateral passage | 70 | optical transmitter |
| 28 | second lateral passage | 72 | interface |
| 30 | conductor (fiber optic) | 74 | $1^{st}$ end of fiber optic |
| 32 | identification element | 76 | optical detector |
| 36 | spring washer | 78 | ADC |
| 38 | corner portion | 80 | pressure sensor |
| 40 | shoulder | 82 | ADC |
| 50 | monitoring and detection unit | 90 | tamper prevention system |
| | | 92 | bag |
| 52 | battery | 94 | evacuation port |
| 54 | processor | 96 | end cap |

The invention claimed is:

1. A sealing bolt for sealing a container lid to a container body, said sealing bolt comprising:
    a seal head adapted to be mounted to said container lid;
    a seal stud adapted to be mounted to said container body;
    a pin connecting said seal head to said seal stud,
    a conductor arranged through a transverse passage in said pin,
    a resilient member arranged for biasing the pin into a first position in which the conductor is compressed, wherein the pin is movable against the biasing by the resilient member into a second position in which the conductor is uncompressed by application to the seal head of a predetermined torque, and
    a monitoring and detection unit, the monitoring and detection unit including a transmitter and a detector coupled to respective ends of the conductor, a processor, coupled to the transmitter and the detector, the processor being operable to determine that the pin has been moved into the second position for a first time when the processor determines that a signal from the transmitter detected by the detector has undergone a predetermined change caused by the conductor going from being compressed to being uncompressed.

2. The sealing bolt according to claim 1, wherein the predetermined change comprises a change in detected signal magnitude greater than a first predetermined threshold.

3. The sealing bolt according to claim 1, wherein the predetermined change comprises a transition in detected signal magnitude from below a second predetermined threshold (VL) to above a third predetermined threshold (VU).

4. The sealing bolt according to claim 1, wherein the predetermined change comprises (i) a change in detected signal magnitude or (ii) a transition in detected signal magnitude having a duration less than or equal to a predetermined time threshold.

5. The sealing bolt according to claim 4, wherein the processor is operable to sample the detected signal magnitude at a predetermined frequency to derive sampled signal magnitudes.

6. The sealing bolt according to claim 5, wherein the monitoring and detection unit further comprises non-volatile memory, and wherein the processor is operable to store the sampled signal magnitudes in a log in the non-volatile memory.

7. The sealing bolt according to claim 6, wherein the sampled signal magnitudes are time- and date-stamped in the log in the non-volatile memory.

8. The sealing bolt according to claim 1, wherein the conductor comprises an optical fiber, the transmitter comprises an optical transmitter, and the detector comprises an optical detector.

9. The sealing bolt according to claim 1, wherein the conductor comprises an electrical fiber, the transmitter comprises an electrical transmitter, and the detector comprises an electrical detector.

10. The sealing bolt according to claim 1, wherein the conductor comprises a fluid tube, and the detector comprises a pressure detector or a flow detector.

11. The sealing bolt according to claim 1, wherein the monitoring and detection unit further comprises one or more visual indication elements.

12. The sealing bolt according to claim 11, wherein the processor is operable to illuminate the one or more visual indication elements (i) in a first state, indicating that the pin has not yet been moved out of the first position, or (ii) in a second state, indicating that that the pin has been moved into the second position for the first time.

13. The sealing bolt according to claim 12, wherein (i) in the first state, one of the one or more visual indication elements are illuminated and, in the second state, two or more of the visual indication elements are illuminated, and/or (ii) in the first state, the one or more visual indication elements are illuminated in a first color and, in the second state, the one or more visual indication elements are illuminated in a second color different than the first color.

14. The sealing bolt according to claim 1, wherein the predetermined torque corresponds to a compressive force on the resilient member lying in a range of 700-2500 daN.

15. The sealing bolt according to claim 1, wherein the predetermined torque corresponds to an axial displacement of the pin relative to the seal head lying in a range of 0.5-1.5 mm.

16. A method of installing a sealing bolt, comprising:
    providing a sealing bolt according to claim 1;
    transporting the sealing bolt to an installation site at which a container to be sealed is disposed;
    verifying that the sealing bolt has not been tampered with; and if not
    installing the sealing bolt on the container;
    wherein said installing includes applying the predetermined torque to the sealing head of the sealing bolt until the processor determines that the signal detected by the detector has undergone the predetermined change.

17. The method of installing a sealing bolt according to claim 16, wherein the transporting the sealing bolt to an installation site comprises:
    placing the sealing bolt in a tamper prevention system;

transporting the tamper prevention system to the installation site at which the container to be sealed is disposed;
verifying that the tamper prevention system has not been tampered with; and if not,
removing the sealing bolt from the tamper prevention system.

18. The sealing bolt of claim 14, wherein the range is 700-1500 daN.

19. The sealing bolt of claim 15, wherein the range is 0.7-1.3 mm.

\* \* \* \* \*